(12) United States Patent
Dietzel

(10) Patent No.: US 6,296,283 B1
(45) Date of Patent: Oct. 2, 2001

(54) FLEXIBLE HOSE SLEEVE

(75) Inventor: Klaus Dietzel, Goch (DE)

(73) Assignee: Dipl.-lng. K. Dietzel GmbH, Beerwalde (DE)

(*) Notice: Subject to any disclaimer, the term of this patent is extended or adjusted under 35 U.S.C. 154(b) by 0 days.

(21) Appl. No.: 09/269,424

(22) PCT Filed: Sep. 27, 1997

(86) PCT No.: PCT/DE97/02226

§ 371 Date: Mar. 26, 1999

§ 102(e) Date: Mar. 26, 1999

(87) PCT Pub. No.: WO98/13637

PCT Pub. Date: Apr. 2, 1998

(30) Foreign Application Priority Data

Sep. 27, 1996 (DE) ............................................. 196 39 794

(51) Int. Cl.⁷ .................................................. F16L 33/20
(52) U.S. Cl. ....................... 285/256; 285/259; 29/890.144
(58) Field of Search ................................... 285/256, 257, 285/259; 29/890.144

(56) References Cited

U.S. PATENT DOCUMENTS

| | | |
|---|---|---|
| 916,076 | 3/1909 | Whitmore . |
| 1,241,626 | 10/1917 | Hachmann . |
| 1,454,073 | 5/1923 | Paradice . |
| 1,778,244 * | 10/1930 | Cadden ................................. 285/256 |
| 2,142,768 * | 1/1939 | Tompkins ............................. 285/257 |
| 2,179,200 * | 11/1939 | Scholtes .............................. 285/256 |
| 2,273,398 * | 2/1942 | Couty et al. ......................... 285/256 |
| 2,279,437 | 4/1942 | Beugler . |
| 2,314,000 * | 3/1943 | Lusher et al. ........................ 285/257 |
| 2,374,225 * | 4/1945 | Melson ................................ 285/256 |
| 2,481,001 * | 9/1949 | Burckle ............................... 285/256 |
| 2,978,263 * | 4/1961 | Walsh et al. ......................... 285/256 |
| 3,017,203 | 1/1962 | Macleod . |
| 3,530,900 | 9/1970 | Kish . |
| 3,534,988 | 10/1970 | Lindsey . |
| 3,549,180 * | 12/1970 | MacWilliam ........................ 285/256 |
| 4,948,178 * | 8/1990 | Sauer .................................. 285/256 |
| 5,267,758 * | 12/1993 | Shah et al. .......................... 285/256 |
| 5,899,235 * | 5/1999 | Thorpe et al. ....................... 285/257 |

FOREIGN PATENT DOCUMENTS

| | | |
|---|---|---|
| 2 258 207 | 8/1973 | (DE) . |
| 30 03 368 | 8/1981 | (DE) . |
| 40 21 746 | 1/1992 | (DE) . |
| 0 018 195 | 10/1980 | (EP) . |
| 1495499 | 8/1967 | (FR) . |

OTHER PUBLICATIONS

The Making, Shaping and Treating of Steel, United States Steel, Chapter 32, The Manufacture of Hot–Strip Mill Products.

* cited by examiner

Primary Examiner—Eric K. Nicholson
(74) Attorney, Agent, or Firm—Merchant & Gould P.C.

(57) ABSTRACT

A hose mount comprises a sheet-metal blank (1) which is bent into a sleeve (16), is provided on one side with cold-formed projections (12, 21) in the form of points (12) or ribs, is bent into a cylindrical body and the edges of which, during bending, are joined together in a form-fitting manner and are finally welded or soldered together.

19 Claims, 4 Drawing Sheets

Figure 6:
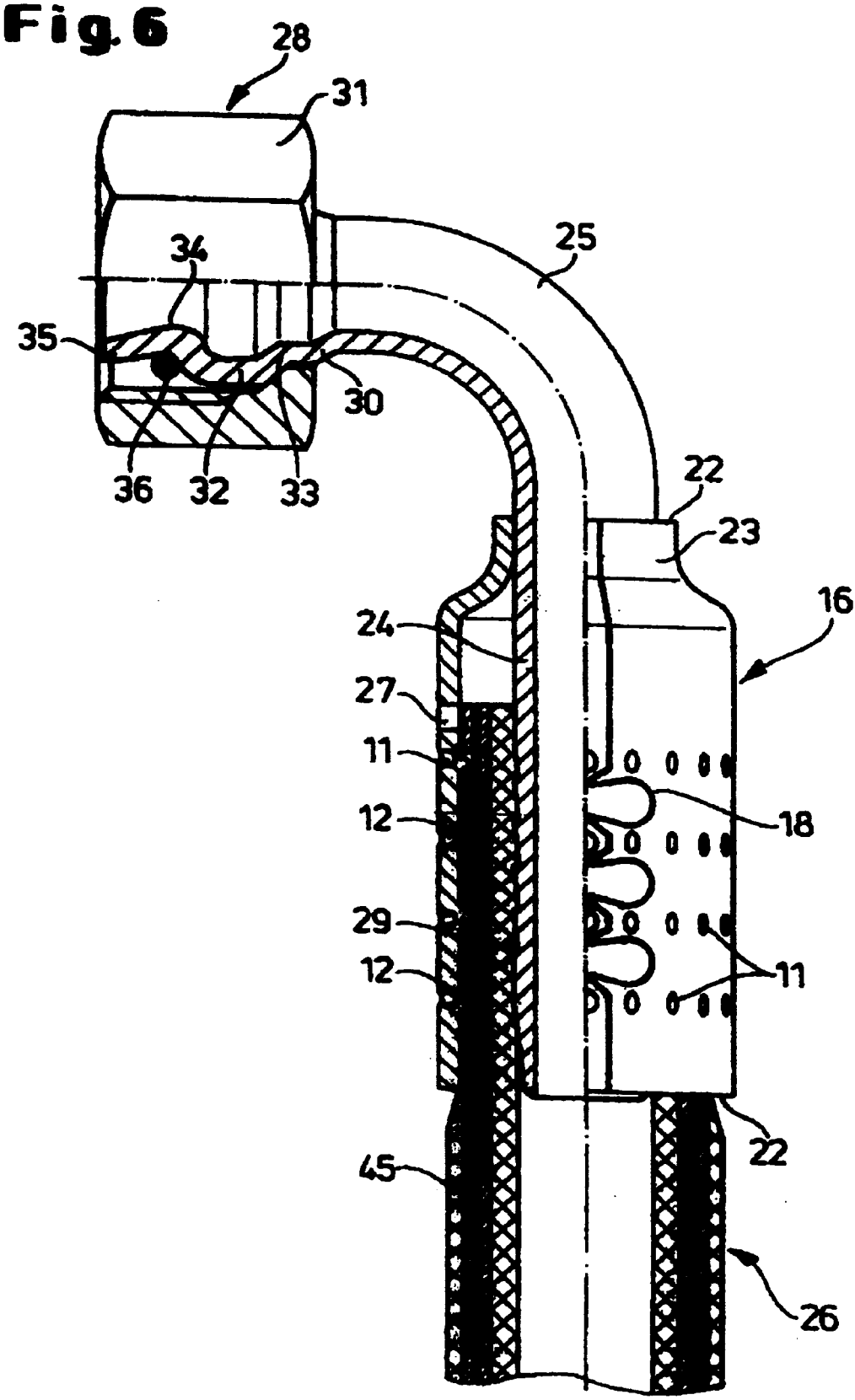

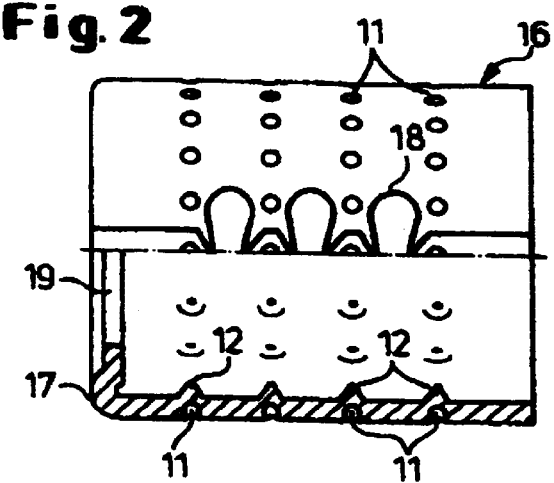
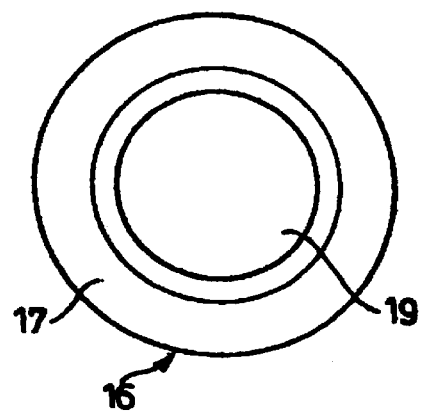
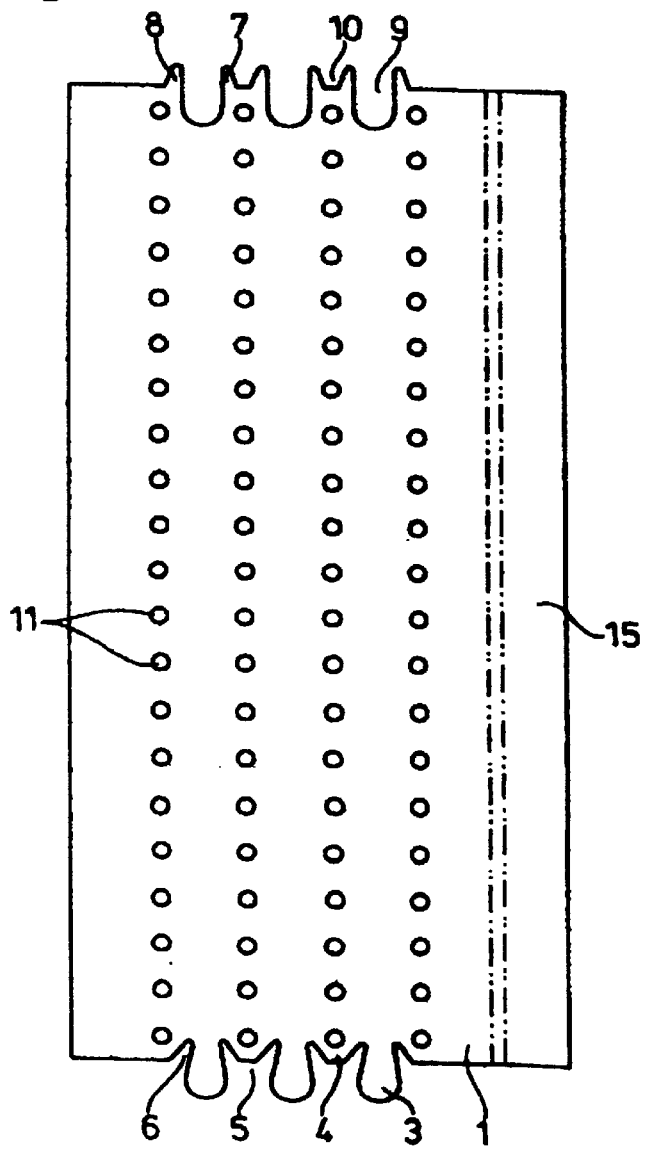

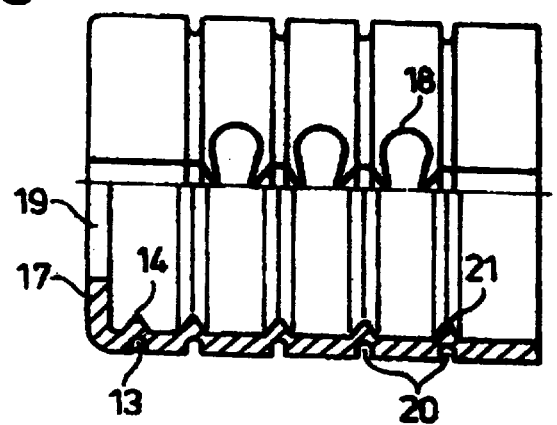
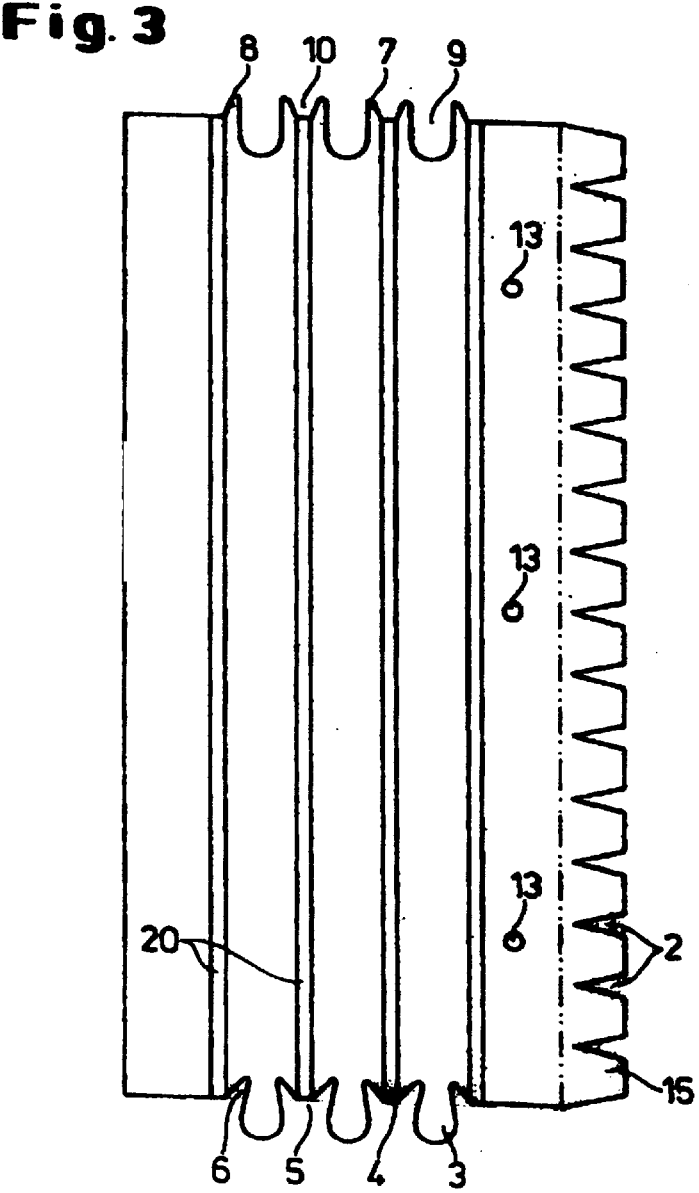

FLEXIBLE HOSE SLEEVE

The invention relates to a hose connection with a hose mount in the form of a sleeve for accommodating a spout and a hose end, to which the sleeve is squeezed.

Hose mounts of this nature are used to releasably screw hoses, for example hydraulic hoses, to connections on machines. This is carried out with the aid of a hose connection having a spout which engages in the hose, for example a high-pressure hose, and is provided with external grooves or ribs and a stop bead, and a screw thread which is arranged on the other end and has a separate union nut for screwing it to a mating connection, for example a pipe end. In view of the pressures in the hose, which are sometimes high to very high, it is necessary to provide a permanent connection, which is suitable for the pressure used, between the mount or sleeve, the hose end and the spout.

Therefore, conventional hose mounts have internal ribs which are approximately triangular in cross section, run transversely with respect to the longitudinal axis of the hose mount, penetrate more or less deeply into the flexible hose material when the parts are pinched together, and anchor the mount in this material.

The internal ribs make conventional hose mounts expensive, because the sleeves are usually produced from solid material by chip-forming machining. To do this, a round bar is firstly cut to length and is then bored. Then, using a special tool, the internal ribs are machined out of the remaining tubular solid material.

This process is extremely time- and material-consuming, since the material of the finished mount constitutes only approximately 25 to 30% of the original volume of the bar section which was cut to length. Consequently, approximately 70 to 75% of the original volume is lost in the form of chips. Furthermore, only steels which are readily machinable and consequently have higher lead, sulphur and/or selenium contents are suitable as materials for the hose mount. However, depending on the particular application, it would be desirable to have a freer choice of materials. In addition, the introduction of heat when soldering or welding may lead to microstructural changes which reduce the strength of the material.

Although the loss of material when pipes are used to produce hose connections by means of chip-forming internal machining is considerably lower, the advantage in terms of costs is not significant, since the pipes must have a comparatively great wall thickness and generally represent considerably more expensive starting materials than round bars of the same diameter. Correspondingly thick-walled pipes are required in order to be able to form the internal ribs out of the pipe wall by machining.

The invention is based on the problem of providing a hose connection with a hose mount which can be produced in a short time and with little or no loss of material.

This problem is solved by a hose connection with a hose mount made from a sleeve which comprises, for example, cold-rolled deep-drawing sheet or strip metal and has cold-formed projections which face inwards, for example in the form of internal ribs, protuberances and points which run all the way around.

A hose mount of this nature can be produced from suitably dimensioned rectangular sheet-metal blanks using cold-rolled strip, the width of which corresponds to the length of one edge of the blank. By simply cutting the strip with the aid of a shear, the blanks can easily be produced with two edges of any desired length; they are then provided with the projections on one side with the aid of a cold-working tool. This may, for example, be carried out with the aid of a roller which is provided with ribs and which presses internal ribs out of the sheet-metal blank. This results in a blank which is provided with grooves on one side and with ribs on the other side. Instead of the ribs, or even in addition to the ribs, the blank may—using a type of spiked roller—be provided with indents and on the other side with points by cold-forming.

The cold-formed blank is then bent into a cylinder. The abutting edges are then permanently joined together by welding or soldering. Before being bent into a cylinder, however, the blank may also be bent off on one side in the direction running transversely to the sleeve axis, in order to produce a sleeve which on one side is reduced to a smaller opening.

In order to improve the service life and the dimensional stability of the sleeve when soldering or welding, the abutting edges may also be in meandering form. Such a profile of the abutting edges is produced if, in the region of an abutting edge, the blank, by stamping, is provided with tongues and the opposite side of the blank is provided with complementary, approximately Ω-shaped recesses. The two mutually opposite edges do not have to have identical contours or be congruent, since the strength of the initially form-fitting connection produced when bending into a cylinder is increased, at the abutment area, if the edges of the blank which come into contact with one another undergo cold deformation or even cold welding at this location.

When producing the sleeve, a blank which is bent off on one side can be deformed in such a way that the sleeve acquires a collar which projects inwards. In this case, the considerably smaller free cross section of the collar results in a considerable deformation of material, with a correspondingly high level of work hardening. However, this can be largely avoided if the edge of the blank formed during the bending-off operation is firstly provided, by stamping, with, for example, wedge-shaped incisions, the mutually opposite edges of which come to bear against one another when the collar is being cold-formed.

The hose mount according to the invention is suitable in particular for hose connections as described in the documents of German patent application 196 18 819.9. The content of these application documents is therefore to be regarded as a constituent part of the present invention.

These hose connections comprise a pipe piece which on one side is formed as a standard spout, but on the screw-thread side merges, via an outer corrugation, into an outer bead. Both features can readily be produced by simple cold-forming, essentially by widening and, for example, axial compression in the form of inwards folding.

Since the bead—in contrast to a conventional groove for an O-ring—does not have to be machined or rolled in using a hard-metal tool, but rather is produced by compression or depression in the course of inwards folding, an advantageous bead cross section is produced without a high level of outlay.

The bead is preferably situated at the foot of a funnel-shaped widened section which forms the transition to the cross section of the mating connection or pipe end.

In this case, the hose connection may, on the screw-thread side, be approximately in the form of two cones which are connected to one another via a constriction. The bead then runs in the area of the constriction and advantageously has a triangular cross section which, when screwed to the mating connection, is filled to a greater or lesser extent by the sealing ring, which is then considerably deformed.

A hose mount which is provided with points provides a particularly secure connection, since the points penetrate into the diamond-shaped meshes of the hose fabric. The tear resistance is particularly high if this is a wire fabric or wire mesh.

In order to avoid a funnel-shaped widening of the sleeve when forming the internal collar, an annular disc may be arranged in the area of the bending edge, around which disc the bent-off strip of the metal sheet is laid when producing the internal collar.

The interior of the hose mount may also be provided with one or more stops for the hose end, in order to hold the hose end at a certain distance from the internal collar. When pinching together the hose and the nipple, on the one hand, and the sleeve, on the other hand, this distance allows axial expansion into the free space between the stops and the internal collar.

Since the hose mount according to the invention is produced only by deformation and there is at most a slight loss of material when stamping recesses on one or more edges of the sheet-metal blank, the production costs are extremely low when compared to machining from solid material.

Figure 7:
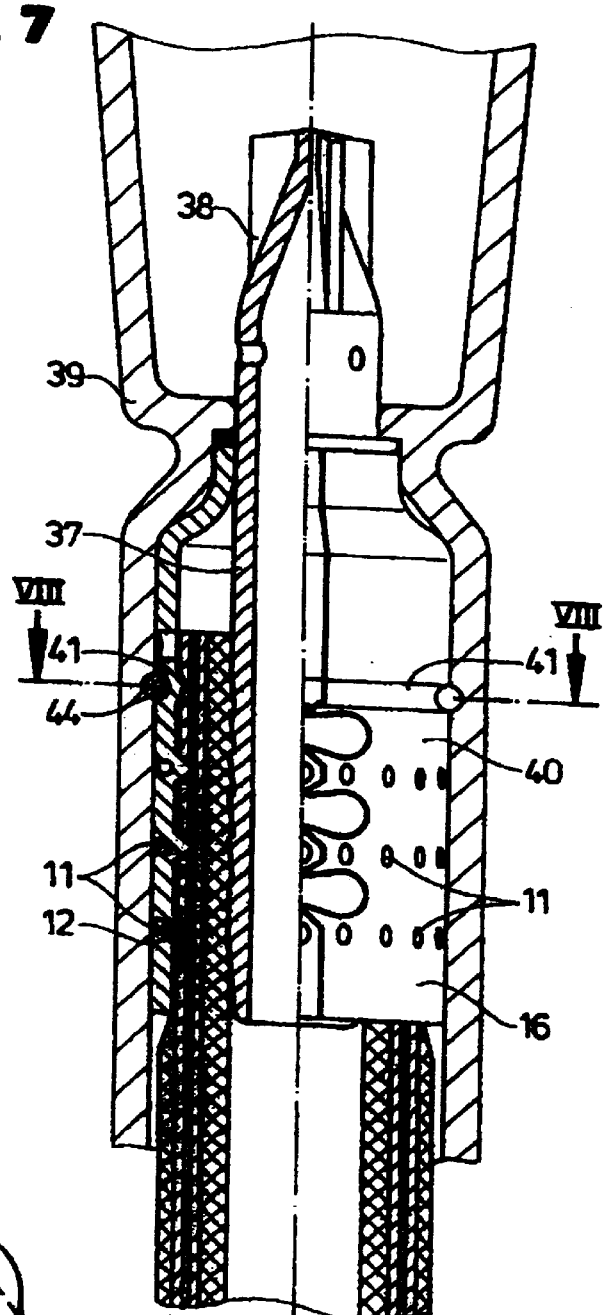
Figure 8:
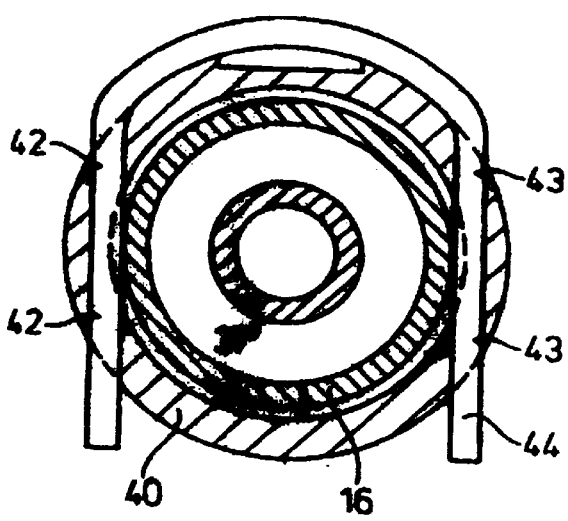

The invention is explained in more detail below with reference to exemplary embodiments which are illustrated in the drawing, in which:

FIG. 1 shows a finished sheet-metal blank with straight longitudinal edges,

FIG. 2 shows an axial, longitudinal section through a sleeve which has been formed from the blank shown in FIG. 1, FIG. 3 Shows a finished sheet-metal blank which has been provided with grooves and ribs and has a saw-tooth-like longitudinal edge, FIG. 4 shows an axial, longitudinal section through a sleeve formed from the sheet-metal blank shown in FIG. 3, FIG. 5 shows a plan view of the sleeve shown in FIG. 1, in the axial direction, FIG. 6 shows a hose connection with a hose mount according to the invention, FIG. 7 shows a hose mount according to the invention with a spout, the free end of which is designed as a nozzle, and FIG. 8 shows a section on line VIII—VIII in FIG. 7.

The sheet-metal blank 1 has two continuous, straight edges (FIG. 1) or is provided on one edge with wedge-shaped incisions 2 (FIG. 3). On one edge, the blanks have tongues 3, 4 and recesses 5, 6. Tongues 7, 8 on the opposite edge of the blank 1 engage in these recesses, while the tongues 3, 4 engage in corresponding recesses 9, 10 on the opposite edge of the blank.

The blank 1 is provided with indents 11 and corresponding points 12 or bulges. Moreover, the blank 1 has special indents 13 with points 14 which serve as stops for the end edge of a hose. Before the blank 1 is rolled or bent, an edge strip 15 is bent off, so that when the blank is bent into a cylindrical body a sleeve 16 with an internal collar 17 and points 12, 14 which face inwards is formed.

After the bending operation, the tabs 3, 4, 7, 8 and the complementary recesses 5, 6, 9, 10 hold the sleeve 16 together in a form-fitting manner and produce a partly straight, partly meandering joint 18 which can easily be closed up by welding, for example laser welding, or by soldering.

If the blank 1 has incisions 2 (FIG. 3), the incisions disappear when the blank is bent into a cylinder and the result is an opening 19 with a continuous edge (FIGS. 3, 5), as with the use of a blank without edge incisions (FIGS. 1, 2). The opening is intended for a spout (not shown) which, like the sleeve 16, is pinched to a hose end in such a way that the points 12 penetrate into the wall of the hose. The points 12 are dimensioned in such a way that they penetrate as far as into the customary hose fabric and, as it were, hook onto the meshes of the fabric.

As an alternative to the indents 11 and the points 12, the blank 1 may also be provided with grooves 20 and corresponding ribs 21.

A blank with mutually opposite straight edges 22, when it is being rolled or bent, may also be formed in such a way on one side that a bottleneck-like narrowed section 23 is produced, surrounding a spout 24 in the form of one end of a 90° curve 25 with surface-to-surface contact, and this narrowed section is then welded or soldered to the spout. The result is an annular space into which a hose 26 can be separately inserted and pinched together with the spout 24 and the sleeve 16 in a customary manner.

In order to be able to position the hose 26 accurately, the sleeve 16 is provided with a viewing hole 27.

The hose connection comprises the pipe piece or pipe bend 25 with the spout 24 at one end and a screw thread 28 at the other end, these two sections being connected to one another via a curved central section.

The spout 24 is provided in a customary manner, for example by scratching, with external ribs 29 and with a stop corrugation 30, in front of which a separate union nut 31 is arranged.

On the screw-thread side, the hose connection has a corrugation 32 which faces outwards and merges more or less continuously into a triangular bead 33 and an internal corrugation 34 and then into a funnel-shaped widened section 35.

An O-ring 36 of relatively large cross section is situated in the bead 33, which O-ring, after screw connection has been made, is considerably deformed under the influence of the mating connection and in the process more or less fills up the bead 33. The result is a sealed connection which is suitable for even very high pressures.

The spout 24 with a pipe screw thread may also be replaced by a straight spout 37, the free end of which is designed as a nozzle 38 and opens into a funnel 39 which is provided with a receiving section 40 for the sleeve 16. To releasably connect the funnel 39 to the hose mount, the sleeve 16 has a groove 41 which runs all the way around and in which a bracket 44, which has been fitted through pairs of holes 42, 43 in the receiving section 40, engages.

The outlay involved in producing the hose mount according to the invention is not great, because it is merely necessary to cut a suitable piece off a strip having the width of the blank 1. The blank can then be provided with the edge structure which can be seen in FIGS. 1, 3 and the indents 11, 13 in a single operation by punching and stamping and, if appropriate, can be bent off. In a second working step, the blank is then bent or rolled into a cylindrical sleeve 16, and then all that remains is to weld or solder together the edges of the blank which are in contact with one another. The resultant hose mount can be provided with a spout and pinched to a hose end in a customary manner. In the process, the projections or the points 12, 21 penetrate into the hose material and, given a suitable length, ultimately reach the steel mesh 45 which is embedded in the hose 26. In this way, the points become hooked into the mesh, resulting in a joint with a holding force which is a multiple of that of conventional hose connections.

What is claimed is:

1. Hose connection having a hose mount comprising
   a sleeve made from a sheet-metal blank which has been
      bent into a cylinder and joined together at abutting edges, the abutting edges comprising tongues and recesses, the tongues and recesses being Ω-shaped and configured to interlock so as to prevent spreading of the abutting edges; and projections extending inwardly from the sleeve.

2. Hose connection according to claim 1, wherein the projections comprise points.

3. Hose connection according to claim 1, wherein the projections comprise circumferential rib.

4. Hose connection according to claim 1, further comprising at least one groove external to the sleeve.

5. Hose connection according to claim 1, wherein the sleeve comprises a viewing hole.

6. Hose connection according to claim 1, wherein the hose connection comprises cold-formed material.

7. Hose connection having a hose mount comprising a sleeve made from a sheet-metal blank which has been bent into a cylinder and joined together at abutting edges, the abutting edges comprising tongues and recesses, the tongues and recesses being configured to interlock so as to prevent spreading of the abutting edges;

projections extending inwardly from the sleeve; and a collar extending inwardly from the sleeve made from an edge of the sheet-metal blank having wedge-shaped recesses therein which has been bent together at the recesses.

8. Hose connection having a hose mount comprising a sleeve made from a sheet-metal blank which has been bent into a cylinder and joined together at abutting edges, the abutting edges comprising tongues and recesses, the tongues and recesses being configured to interlock so as to prevent spreading of the abutting edges;

projections extending inwardly from the sleeve; and a bottleneck disposed at an end of the sleeve, the bottleneck having a diameter that is narrower than a diameter of the sleeve.

9. Hose connection having a hose mount comprising a sleeve made from a sheet-metal blank which has been bent into a cylinder and joined together at abutting edges, the abutting edges comprising tongues and recesses, the tongues and recesses being configured to interlock so as to prevent spreading of the abutting edges;

projections extending inwardly from the sleeve; and a pipe piece connected to an end of the sleeve, the pipe piece comprising a spout at a first end, the spout being disposed within the sleeve, the pipe piece comprising at a second end a screw thread, the pipe piece further comprising at the second end an external bead that merges into an outwardly extending corrugation.

10. Hose connection according to claim 9, wherein the pipe piece is seamless.

11. Hose connection according to claim 10, wherein the pipe piece further comprises at the second end form of two cones a constriction disposed between the outwardly extending corrugation and the funnel-shaped widened section.

12. Hose connection according to claim 9, wherein the pipe piece further comprises at the second end a funnel-shaped widened section adjacent to the bead.

13. Hose connection according to claim 9, wherein the pipe piece is composed of deep-drawable steel.

14. Method for producing a hose mount, comprising the steps of:

providing a sheet metal blank with tongues and recesses configured to interlock, providing the sheet metal blank with projections by cold-forming, bending the blank into a cylinder, and joining abutting edges thereof together by interlocking the tongues and recesses, whereby the tongues and recesses prevent spreading of the abutting edges.

15. Method according to claim 14, wherein the blank has an edge strip, and further comprising the step of bending the edge strip such that the edge strip forms an inwardly projecting collar when the blank is bent into a cylinder.

16. Method according to claim 15, further comprising the step of abutting an annular disc against the edge strip after bending the edge strip but prior to bending the blank, such that the edge strip bears against the when the blank is bent into a cylinder.

17. Method according to claim 15, further comprising the step of providing the edge strip with wedge-shaped recesses prior to bending the edge strip.

18. Method according to claim 14, further comprising the step of soldering the abutting edges together.

19. Method according to claim 14, further comprising the step of welding the abutting edges together.

* * * * *